3,357,522
PARKING BRAKE MECHANISM FOR DISK BRAKES

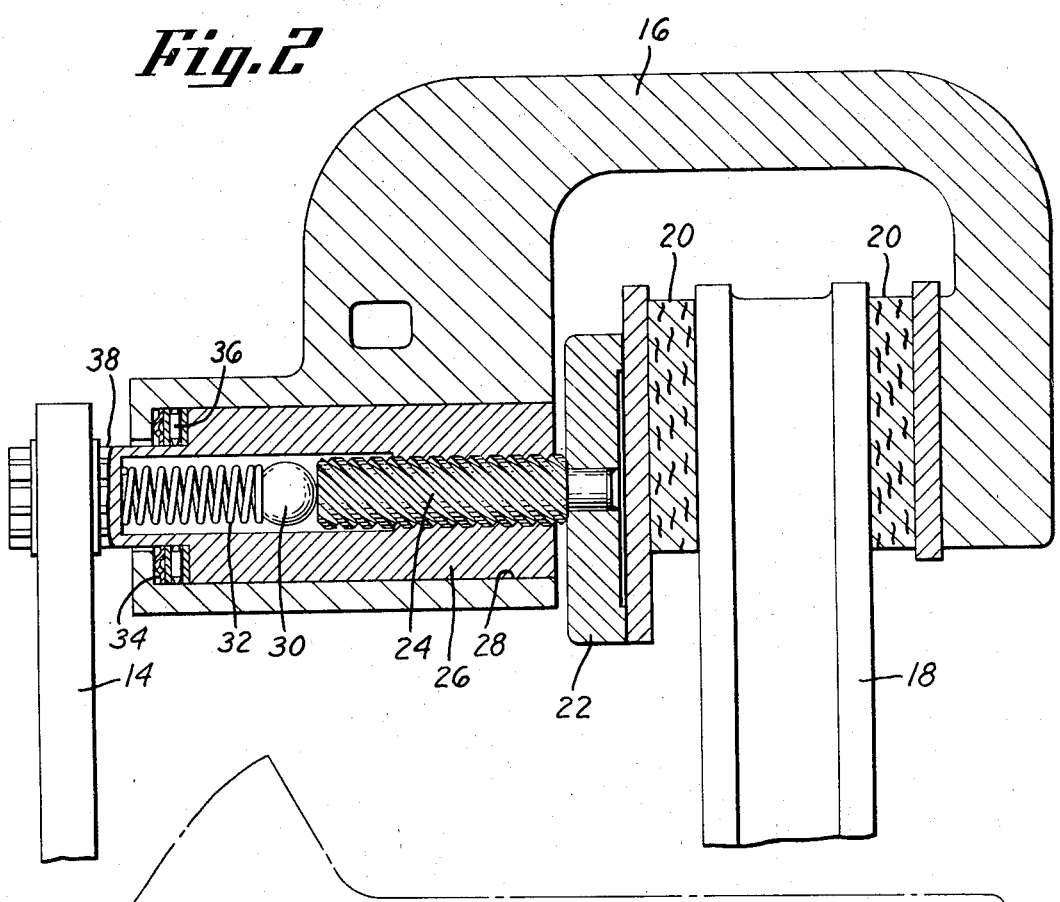
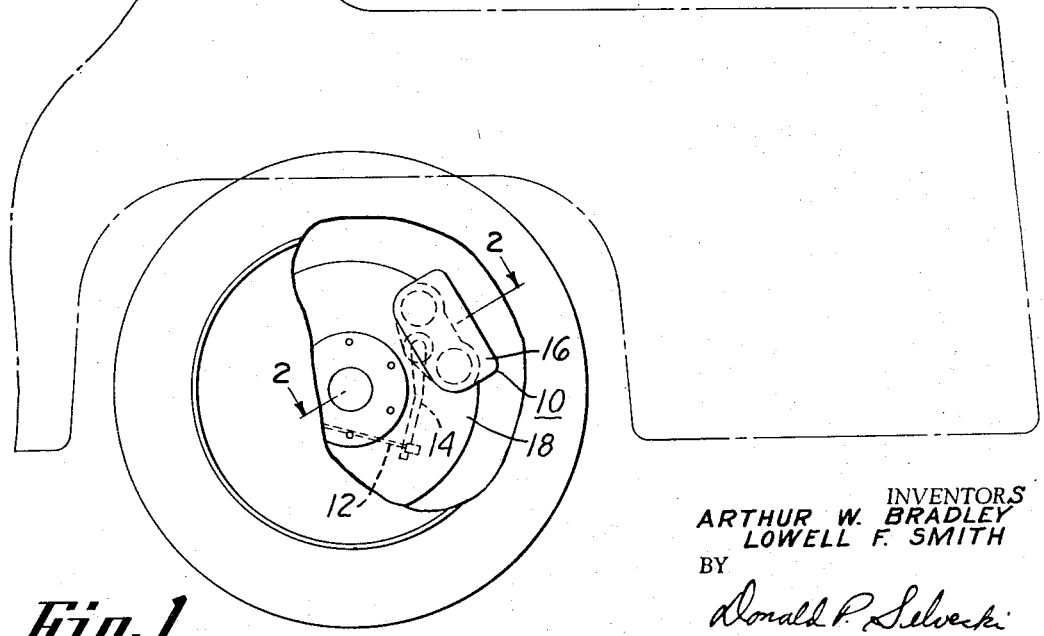

Arthur W. Bradley and Lowell F. Smith, Saginaw, Mich., assignors to General Motors Corporation, Detroit, Mich., a corporation of Delaware
Filed Oct. 1, 1965, Ser. No. 491,933
4 Claims. (Cl. 188—73)

This invention relates to vehicle braking systems and more particularly to a mechanically actuated hand brake.

When vehicles are equipped with caliper type disk brakes it is desirable to provide a parking brake which is compatible with the disk brake design as well as to require few extra parts in keeping with the most desirable type of hand brake for use with caliper type disk brakes. It is also desirable that the actuating movement of the mechanical actuator be held to a minimum.

It is an object of the present invention to provide an improved hand brake mechanism for use with caliper type disk brakes.

It is another object of the present invention to provide an improved hand brake mechanism which requires very little travel for brake actuation and which is operated by rotating a lever pulled by a cable connected to a typical hand brake lever in the driving compartment of a vehicle.

It is another object of the present invention to provide an improved hand brake mechanism according to the aforementioned objects which is simple in nature and economical to manufacture.

Further objects and advantages of the present invention will be apparent from the following description, reference being had to the accompanying drawings wherein a preferred embodiment of the present invention is clearly shown.

In the drawings:

FIGURE 1 illustrates the subject invention in its operating environment.

FIGURE 2 is a sectional view of the subject invention taken along the line 2—2 of FIGURE 1.

Referring to FIGURE 1, a caliper type disk brake assembly generally designated by the numeral 10 is shown operatively installed on a rear wheel of a vehicle. Cable 12, drivably engaging lever 14, is drawn towards the driving compartment of the vehicle in any well-known manner to actuate the subject device.

Caliper type disk brake housing 16 is illustrated in FIGURE 2 as being operatively positioned on either side of disk 18. Dragging friction pads 20 positioned against either side of disk 18 are driven more firmly into disk 18 during rotation thereof to provide a braking action. Element 22 carried by drive means 24 engages a portion of disk friction pad 20 to provide a mechanical actuating capability for the subject disk brakes. Drive means 24 is a high lead screw rotatable in sleeve means 26 which in turn is freely rotatable in chamber 28 of housing 16. Sleeve means 26 has an interior threaded portion cooperating with the high lead screw 24 so that rotation of sleeve means 26 in the opposite direction to the lead angle of the threaded portion of drive means 24 results in a force transmission through element 22 into friction pad 20. Screw 24 is maintained at one extreme of axial movement in sleeve means 26 by ball 30 biased against a wall of sleeve 26 by spring 32. Lever 14 is splined to sleeve 26 so as to be nonrotatable with respect thereto.

Axial thrust against sleeve means 26 is taken up by wave washer 34 and needle bearings 36 positioned radially away from peripheral surface 38 of sleeve 26. Therefore, during operation of the subject device when sleeve 26 is rotated and a force is exerted by element 22 against friction pad 20, the sleeve 26 remains freely rotatable due to the radially positioned needle bearings.

In operation the subject device is actuated by pressure against cable 12 acting on lever 14 tending to rotate lever 14 around the axis of sleeve 26. Referring to FIGURE 2, sleeve 26, being freely rotatable in chamber 28, is rotated, carrying drive means 24 and element 22 more firmly into engagement with friction pad 20. Element 22 is forced against friction pad 20, resulting in a force being transmitted to disk 18 with no rotation between pad 20 and element 22. As sleeve means 26 continues to be rotated, a force is exerted against friction pad 20 resulting in a braking action developing between friction pad 20 and disk 18. The reactive force is taken up by wave washer 34 and needle bearing 36.

When rotating pressure is released from lever 14 the energy stored in wave washer 34 allows a slight amount of movement to sleeve means 26 which relieves a pressure from drive means 24 and element 22 acting against friction pad 20. It is understood that the engagement of element 22 with friction pad 20 during periods of operation when the brakes are not applied is maintained by the force exerted by spring 32 through ball 30 against the end of drive means 24. It is further understood that no relative rotational movement takes place between element 22 and pad 20 during brake actuation because the friction therebetween exceeds the input force from lever 14. Therefore any force from lever 14 is immediately transmitted to pad 20 linearly and a braking action takes place. However, it is clear that, as wear occurs on pad 20, very slight rotation of element 22 relative to pad 20 takes place to automatically take up this wear.

The utility of the subject invention is apparent in an application of a parking brake for use with a disk brake. No separate housing is required for the parking brake mechanism and the same pad utilized during hydraulic pressure operation of this brake is utilized. In FIGURE 1 there is shown a typical mounting position for sleeve means 26 relative to the disk brake assembly 10, it being understood that any appropriate position on the friction pad could be utilized to bring about the braking action. Other inventive features of note are the return action for the drive means 24 generated by stored energy in wave washer 34 and the automatic take-up of the subject invention brought about by cooperation of spring 32 and ball 30. It is understood that as the friction pad 20 decreases in lateral dimension due to lining wear, spring 32 acting through ball 30 slightly rotates drive means 24 to urge it in the direction of friction pad 20 constantly throughout the period of wear of the friction pad 20. Therefore, an automatic adjusting feature is provided for the subject device.

While the embodiment of the present invention as herein disclosed constitutes a preferred form, it is to be understood that other forms might be adopted while keeping within the spirit of the present invention.

What is claimed is as follows:

1. Hand brake actuating mechanism for disk brakes, said actuating mechanism comprising: a housing formed as a portion of a caliper type disc brake, a disc situated in juxtaposition to said housing; sleeve means rotatable in said housing; threaded drive means threadingly engaging said sleeve means and axially movable in said sleeve means, said drive means including an element engaging a friction pad; biasing means carried within said sleeve means urging said drive means toward an extreme of axial movement in said sleeve means; and lever means carried for rotation with said sleeve means for driving said sleeve means rotationally in opposition to the threads of said drive means to cause axial movement thereof toward the disk.

2. Hand brake actuating mechanism according to claim 1 wherein said drive means is a high lead screw and said sleeve means has an interior threaded portion cooperating with said high lead screw to provide rapid traverse capability for said screw means relative to said sleeve means as said lever means is rotated.

3. Hand brake actuating mechanism according to claim 1 wherein a wave washer is peripherally carried by a portion of said sleeve means and is compressed between said housing and said sleeve means during brake actuation thereby storing energy for return of the actuating mechanism to a poised position.

4. Hand brake actuating mechanism according to claim 3 wherein needle bearings are carried radially of said sleeve means to allow free rotation of said sleeve means relative to said wave washer during brake actuation.

References Cited

UNITED STATES PATENTS

| | | | |
|---|---|---|---|
| 2,196,799 | 4/1940 | Keplinger | 188—79.5 |
| 2,612,968 | 10/1952 | Hood | 188—73 X |
| 2,835,350 | 5/1958 | Butler | 188—73 |
| 3,024,873 | 3/1962 | Wilkinson | 188—73 |
| 3,046,055 | 7/1962 | Martens | 188—196 X |
| 3,091,311 | 5/1963 | Sander | 188—196 |
| 3,095,949 | 7/1963 | Butler | 188—73 |
| 3,114,436 | 12/1963 | Larson | 188—73 |
| 3,155,194 | 11/1964 | Gancel | 188—73 |

MILTON BUCHLER, *Primary Examiner.*

G. E. HALVOSA, *Assistant Examiner.*